(12) United States Patent
Yoshida

(10) Patent No.: US 10,496,356 B2
(45) Date of Patent: Dec. 3, 2019

(54) DISPLAY SYSTEM, DISPLAY DEVICE, AND METHOD OF CONTROLLING DISPLAY SYSTEM

(71) Applicant: SEIKO EPSON CORPORATION, Tokyo (JP)

(72) Inventor: Mitsuhiro Yoshida, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 28 days.

(21) Appl. No.: 15/483,128

(22) Filed: Apr. 10, 2017

(65) Prior Publication Data

US 2017/0300285 A1   Oct. 19, 2017

(30) Foreign Application Priority Data

Apr. 13, 2016 (JP) .................. 2016-079997

(51) Int. Cl.
  *G06F 3/14* (2006.01)
  *G06F 3/147* (2006.01)
  (Continued)

(52) U.S. Cl.
  CPC ............ *G06F 3/1454* (2013.01); *G06F 3/147* (2013.01); *G06F 3/1423* (2013.01); *G06T 11/60* (2013.01);
  (Continued)

(58) Field of Classification Search
  CPC ........... H04N 13/0033; H04N 13/0497; H04N 9/3155; H04N 9/3179; H04N 7/15; G06F 3/048; G06F 3/0481; G06F 3/04815; G06F 3/0483; G06F 3/1454; G06F 3/1423; G06F 3/147; G06F 3/0416; G06T 11/30; G06T 11/60; G09G 2340/10; G09G 5/12; G09G 2370/16; G09G 2360/04; H04M 3/567; G06Q 10/101
  See application file for complete search history.

(56) References Cited

U.S. PATENT DOCUMENTS 4,805,205 A  *  2/1989  Faye ..................... H04M 3/56
                                              348/14.08
5,758,110 A  *  5/1998  Boss ..................... G06F 3/0481
                                              715/204
(Continued)

FOREIGN PATENT DOCUMENTS

JP    2007-127853 A    5/2007
JP    2010-278824 A   12/2010
(Continued)

*Primary Examiner* — Devona E Faulk
*Assistant Examiner* — Charles L Beard
(74) *Attorney, Agent, or Firm* — Oliff PLC

(57) ABSTRACT

A display system has a first tablet terminal, a second tablet terminal, and a projector capable of communicating with the first tablet terminal and the second tablet terminal via the communication network. The projector requests transmission of first data to the first tablet terminal, and at the same time requests transmission of second data to the second tablet terminal. The first tablet terminal and the second tablet terminal transmit the first data and the second data to the projector in accordance with the request from the projector at respective timings different from each other via a communication network.

9 Claims, 8 Drawing Sheets

US 10,496,356 B2

Page 2

(51) Int. Cl.
*G06T 11/60* (2006.01)
*H04N 9/31* (2006.01)
*H04N 21/41* (2011.01)
*H04N 21/414* (2011.01)
*H04N 21/4363* (2011.01)
*H04N 21/443* (2011.01)
*H04N 21/462* (2011.01)

(52) U.S. Cl.
CPC ......... *H04N 9/3155* (2013.01); *H04N 9/3182* (2013.01); *H04N 9/3188* (2013.01); *H04N 21/4108* (2013.01); *H04N 21/4122* (2013.01); *H04N 21/41407* (2013.01); *H04N 21/43637* (2013.01); *H04N 21/4438* (2013.01); *G09G 2340/10* (2013.01); *H04N 21/4622* (2013.01)

(56) References Cited

U.S. PATENT DOCUMENTS

| | | | | |
|---|---|---|---|---|
| 6,154,211 A * | 11/2000 | Kamachi | G06F 3/04815 | 345/419 |
| 6,437,777 B1 * | 8/2002 | Kamachi | G06F 3/04815 | 345/419 |
| 8,106,895 B2 * | 1/2012 | Fujimori | H04N 11/042 | 345/1.2 |
| 8,199,153 B2 * | 6/2012 | Fujimori | H04N 9/3141 | 345/1.2 |
| 8,375,323 B2 * | 2/2013 | Yajima | G06F 3/1454 | 715/759 |
| 8,884,842 B2 * | 11/2014 | Yoshizawa | G06F 3/14 | 345/1.1 |
| 8,910,057 B2 * | 12/2014 | Hornback, Jr. | G06F 3/1454 | 715/753 |
| 9,041,524 B2 * | 5/2015 | Karasawa | G06F 3/0486 | 340/468 |
| 9,128,358 B2 * | 9/2015 | Kubota | G03B 21/14 | |
| 9,177,405 B2 * | 11/2015 | Kodama | H04L 29/06401 | |
| 9,310,883 B2 * | 4/2016 | Weising | G09G 5/08 | |
| 9,406,280 B2 * | 8/2016 | Ota | G09G 5/12 | |
| 9,432,644 B2 * | 8/2016 | Ichieda | H04N 9/3197 | |
| 9,519,379 B2 * | 12/2016 | Ichieda | G06F 3/0425 | |
| 9,575,713 B2 * | 2/2017 | Kubota | G06F 3/1454 | |
| 9,665,335 B2 * | 5/2017 | Eguchi | G06F 3/1454 | |
| 9,733,736 B2 * | 8/2017 | Suzuki | G06F 3/038 | |
| 9,736,540 B2 * | 8/2017 | Anderson | H04N 21/47205 | |
| 9,807,342 B2 * | 10/2017 | Fogarty | H04N 7/147 | |
| 2002/0118302 A1 * | 8/2002 | Iizuka | H04N 5/265 | 348/578 |
| 2003/0160792 A1 * | 8/2003 | Alcorn | G06F 3/14 | 345/502 |
| 2004/0130568 A1 * | 7/2004 | Nagano | G06F 3/1454 | 715/733 |
| 2004/0201544 A1 * | 10/2004 | Love | G06F 3/1423 | 345/1.1 |
| 2005/0210390 A1 * | 9/2005 | Ono | G06F 3/14 | 715/730 |
| 2006/0184497 A1 * | 8/2006 | Suzuki | G06F 16/4393 | |
| 2006/0187228 A1 * | 8/2006 | Jung | G06F 3/1454 | 345/537 |
| 2006/0288293 A1 * | 12/2006 | Karasawa | G06F 3/0486 | 715/730 |
| 2006/0292537 A1 * | 12/2006 | Nute | G09B 5/06 | 434/307 A |
| 2007/0040993 A1 * | 2/2007 | Yokoyama | G03B 21/26 | 353/42 |
| 2009/0043846 A1 * | 2/2009 | Inoue | G06F 3/14 | 709/204 |
| 2009/0044116 A1 * | 2/2009 | Kitabayashi | G06F 3/048 | 715/716 |
| 2009/0153751 A1 * | 6/2009 | Asakura | G06F 3/1454 | 348/744 |
| 2010/0017744 A1 * | 1/2010 | Kikuchi | G06F 3/1446 | 715/781 |
| 2010/0017745 A1 * | 1/2010 | Kikuchi | G06F 3/1454 | 715/781 |
| 2010/0107128 A1 * | 4/2010 | Thukral | G06F 3/1454 | 715/867 |
| 2010/0253621 A1 * | 10/2010 | Suzuki | G06F 3/0346 | 345/157 |
| 2010/0302130 A1 * | 12/2010 | Kikuchi | G06F 3/0481 | 345/1.3 |
| 2010/0302454 A1 * | 12/2010 | Epstein | H04N 5/268 | 348/705 |
| 2011/0066259 A1 * | 3/2011 | Suzuki | G05B 15/02 | 700/83 |
| 2011/0217021 A1 * | 9/2011 | Dubin | H04N 7/147 | 386/278 |
| 2011/0221763 A1 * | 9/2011 | Arizumi | G06F 3/1454 | 345/619 |
| 2011/0234474 A1 * | 9/2011 | Natori | H04N 5/04 | 345/1.3 |
| 2011/0252384 A1 * | 10/2011 | Calman | G06F 3/1454 | 715/864 |
| 2012/0001832 A1 * | 1/2012 | Braghis | G06F 3/1454 | 345/2.2 |
| 2012/0030594 A1 * | 2/2012 | Yokoyama | G06F 3/1454 | 715/765 |
| 2012/0098733 A1 * | 4/2012 | Masuda | G06F 3/1454 | 345/2.2 |
| 2012/0237916 A1 * | 9/2012 | Fujita | G09B 5/02 | 434/324 |
| 2012/0256924 A1 * | 10/2012 | Uema | H04N 21/4122 | 345/428 |
| 2013/0033679 A1 * | 2/2013 | Mukasa | G03B 21/26 | 353/30 |
| 2013/0047190 A1 * | 2/2013 | Suzuki | H04N 1/00267 | 725/86 |
| 2013/0106820 A1 * | 5/2013 | Seo | H04N 13/341 | 345/211 |
| 2013/0162607 A1 * | 6/2013 | Ichieda | G06F 3/0425 | 345/204 |
| 2013/0162671 A1 * | 6/2013 | Fujita | G06F 3/1454 | 345/629 |
| 2013/0210488 A1 * | 8/2013 | Lee | G06F 3/14 | 455/557 |
| 2013/0234934 A1 * | 9/2013 | Champion | G06F 3/012 | 345/156 |
| 2013/0257683 A1 * | 10/2013 | Aruga | G09G 5/003 | 345/1.2 |
| 2013/0328837 A1 * | 12/2013 | Arizumi | G06F 1/1639 | 345/179 |
| 2014/0043361 A1 * | 2/2014 | Mukasa | G09G 5/395 | 345/625 |
| 2014/0047330 A1 * | 2/2014 | Yan | G06F 3/0486 | 715/273 |
| 2014/0089821 A1 * | 3/2014 | Rios, III | G06F 3/14 | 715/761 |
| 2014/0176394 A1 * | 6/2014 | Horiuchi | G06F 3/1415 | 345/1.3 |
| 2014/0223335 A1 * | 8/2014 | Pearson | H04L 65/403 | 715/753 |
| 2014/0340421 A1 * | 11/2014 | Otero | G06T 11/20 | 345/619 |
| 2014/0361954 A1 * | 12/2014 | Epstein | G06F 3/1454 | 345/2.3 |
| 2014/0380193 A1 * | 12/2014 | Coplen | G06F 3/04847 | 715/753 |
| 2015/0002435 A1 * | 1/2015 | Shimizu | G06F 3/04883 | 345/173 |
| 2015/0049163 A1 * | 2/2015 | Smurro | H04L 65/4015 | 348/14.08 |
| 2015/0054968 A1 * | 2/2015 | Murata | H04N 1/00244 | 348/207.1 |
| 2015/0058735 A1 * | 2/2015 | Nagase | H04N 7/15 | 715/733 |
| 2015/0127340 A1 * | 5/2015 | Epshteyn | G10L 15/26 | 704/235 |
| 2015/0130847 A1 * | 5/2015 | Masuoka | G09G 3/20 | 345/665 |

(56) References Cited

U.S. PATENT DOCUMENTS

| | | | |
|---|---|---|---|
| 2015/0138213 A1* | 5/2015 | Turner | G06F 3/048 345/520 |
| 2015/0138229 A1* | 5/2015 | Ghosh | G09G 5/393 345/629 |
| 2015/0138237 A1* | 5/2015 | Ghosh | G09G 5/36 345/634 |
| 2015/0199166 A1* | 7/2015 | Eguchi | G06F 3/1454 345/2.2 |
| 2015/0215570 A1* | 7/2015 | Leibow | G06F 3/1454 386/231 |
| 2015/0235086 A1* | 8/2015 | Demizu | G06K 9/00624 382/103 |
| 2015/0244987 A1* | 8/2015 | Delegue | H04N 7/157 348/14.09 |
| 2015/0277844 A1* | 10/2015 | Kubota | G06F 3/1454 345/2.1 |
| 2015/0309765 A1* | 10/2015 | Nagahara | G06F 3/0488 345/2.2 |
| 2015/0313578 A1* | 11/2015 | Yu | A61B 8/463 600/459 |
| 2015/0339610 A1* | 11/2015 | Hibbert | G06Q 10/06313 705/7.23 |
| 2015/0350737 A1* | 12/2015 | Anderson | H04N 21/47205 348/564 |
| 2015/0370757 A1* | 12/2015 | Duns | G06F 17/212 715/229 |
| 2016/0026253 A1* | 1/2016 | Bradski | G02B 27/225 345/8 |
| 2016/0027402 A1* | 1/2016 | Yanazume | G06F 3/14 345/2.3 |
| 2016/0044079 A1* | 2/2016 | Kasatani | H04N 7/147 709/219 |
| 2016/0055826 A1* | 2/2016 | Abe | G06F 3/1423 345/2.3 |
| 2016/0127686 A1* | 5/2016 | Nagase | H04N 7/15 348/14.07 |
| 2016/0132280 A1* | 5/2016 | Tomonaga | G06F 3/1438 345/502 |
| 2016/0133226 A1* | 5/2016 | Park | G06F 3/01 345/156 |
| 2016/0140740 A1* | 5/2016 | Natori | G06T 11/60 345/629 |
| 2016/0149843 A1* | 5/2016 | Spicer | G06Q 10/101 709/206 |
| 2016/0179456 A1* | 6/2016 | Sivavakeesar | G06F 3/1454 715/727 |
| 2016/0191337 A1* | 6/2016 | Schiewe | G06F 3/04842 715/736 |
| 2016/0212796 A1* | 7/2016 | Wang | H04W 84/12 |
| 2016/0227170 A1* | 8/2016 | Nagahara | H04N 21/4122 |
| 2016/0227179 A1* | 8/2016 | Yanazume | H04N 9/3185 |
| 2016/0266864 A1* | 9/2016 | Rajendran | G09B 5/08 |
| 2016/0283087 A1* | 9/2016 | Nishimura | G06F 3/04845 |
| 2016/0350050 A1* | 12/2016 | Kanamori | H04N 9/3147 |
| 2016/0350062 A1* | 12/2016 | Katsumata | G06F 3/1454 |
| 2016/0352794 A1* | 12/2016 | Guo | H04L 65/601 |
| 2017/0013397 A1* | 1/2017 | Itoh | H04W 4/80 |
| 2017/0024031 A1* | 1/2017 | Ueda | G06F 3/0488 |
| 2017/0031646 A1* | 2/2017 | Imai | H04N 7/147 |
| 2017/0093969 A1* | 3/2017 | Ohta | H04L 67/1074 |
| 2017/0094366 A1* | 3/2017 | Oguchi | H04N 21/23109 |
| 2017/0142379 A1* | 5/2017 | Kihara | H04N 9/3179 |
| 2017/0180372 A1* | 6/2017 | Bezold | G06F 21/6209 |
| 2017/0255304 A1* | 9/2017 | Lee | G06F 3/048 |
| 2017/0316726 A1* | 11/2017 | Yoshida | G09G 3/002 |
| 2017/0324877 A1* | 11/2017 | Tokuchi | H04N 1/00251 |
| 2017/0328733 A1* | 11/2017 | Gotoh | G01C 21/3661 |
| 2017/0351402 A1* | 12/2017 | Yoakum | G06F 3/1454 |
| 2018/0032301 A1* | 2/2018 | Jeacocke | G06F 3/04883 |
| 2018/0060009 A1* | 3/2018 | Peshkar | G06F 3/1423 |
| 2018/0060092 A1* | 3/2018 | Baer | G06Q 10/101 |
| 2018/0061370 A1* | 3/2018 | Ota | G06F 3/1423 |
| 2018/0069962 A1* | 3/2018 | Kato | H04M 3/56 |
| 2018/0084418 A1* | 3/2018 | Walsh | H04W 12/06 |
| 2018/0095711 A1* | 4/2018 | Kanda | G06F 3/1454 |
| 2018/0241786 A1* | 8/2018 | Goto | G06F 3/1423 |
| 2019/0026057 A1* | 1/2019 | Matsuhara | G06F 3/147 |
| 2019/0026063 A1* | 1/2019 | Mabey | G06F 3/017 |

FOREIGN PATENT DOCUMENTS

| | | |
|---|---|---|
| JP | 2013-008210 A | 1/2013 |
| JP | 2013-061380 A | 4/2013 |
| JP | 2015-095018 A | 5/2015 |
| JP | 2015-095019 A | 5/2015 |
| WO | 13-121455 A1 | 8/2013 |

* cited by examiner

| SERIAL NUMBER | TABLET TERMINAL IDENTIFICATION INFORMATION |
|---|---|
| FIRST | A0001<br>(TABLET TERMINAL IDENTIFICATION INFORMATION OF FIRST TABLET TERMINAL) |
| SECOND | A0002<br>(TABLET TERMINAL IDENTIFICATION INFORMATION OF SECOND TABLET TERMINAL) |
| THIRD | A0003<br>(TABLET TERMINAL IDENTIFICATION INFORMATION OF THIRD TABLET TERMINAL) |

FIG. 6

DISPLAY SYSTEM, DISPLAY DEVICE, AND METHOD OF CONTROLLING DISPLAY SYSTEM

CROSS-REFERENCE

The entire disclosure of Japanese Patent Application No. 2016-79997, filed Apr. 13, 2016, is expressly incorporated by reference herein.

BACKGROUND

1. Technical Field

The present invention relates to a display system, a display device, and a method of controlling the display system.

2. Related Art

In the past, there has been known a display system (an image display system) in which a plurality of terminals (image supply devices) and a display device (an image display device) are connected to each other via a network, and the display device receives data corresponding to images from the plurality of terminals, and then displays the plurality of images corresponding to the respective data at the same time (see, e.g., JP-A-2010-278824).

In the system having the plurality of terminals connected to the display device via the network such as the display system described above, there is a possibility that a communication load of the network increases to cause a delay in the communication in the case in which the plurality of terminals transmits the data to the display device at the same time.

SUMMARY

An advantage of some aspects of the invention is to reduce the communication load of the network with respect to the display system having the plurality of terminals and the display device connected to each other via the network.

A display system according to an aspect of the invention includes a first terminal, a second terminal, and a display device capable of communicating with the first terminal and the second terminal via a network, the first terminal includes a first display section adapted to display a first image, and a first communication section adapted to transmit first data corresponding to the first image to the display device, the second terminal includes a second display section adapted to display a second image, and a second communication section adapted to transmit second data corresponding to the second image to the display device, the display device includes a third communication section adapted to receive the first data from the first terminal, and receive the second data from the second terminal, the display device requests the first terminal to transmit the first data, and requests the second terminal to transmit the second data, and the first terminal transmits the first data to the display device via the network in accordance with the request from the display device at a timing different from a timing at which the second terminal transmits the second data to the display device via the network.

According to the configuration of this aspect of the invention, when the first terminal and the second terminal transmit the first data and the second data to the display device in accordance with the request from the display device, it is possible to prevent the plurality of terminals from transmitting the data to the display device at the same time, and thus, the communication load of the network can be reduced.

In the aspect of the invention, the display device may include a third display section adapted to display a composite image including an image corresponding to the first image and an image corresponding to the second image.

According to this configuration of the aspect of the invention, it is possible to display the composite image including the images corresponding to the images displayed on the plurality of terminals.

In the aspect of the invention, the display system may further include a third terminal, the third terminal may request transmission of the first data and the second data to the display device, the display device may transmit the first data received from the first terminal, and the second data received from the second terminal to the third terminal, the third terminal may generate image data of the composite image based on the first data and the second data received, and transmit the image data to the display device, and the display device may display the composite image with the third display section based on the image data of the composite image received from the third terminal.

According to this configuration of the aspect of the invention, regarding the display system in which the display device collects the first data and the second data from the first terminal and the second terminal and then transmits the result to the third terminal in accordance with the request of the third terminal, and at the same time, the third terminal transmits the image data related to the composite image to the display device to thereby display the composite image, the communication load of the network can be reduced.

In the aspect of the invention, the display device may perform a process related to data transmission at intervals when transmitting the first data and the second data to the third terminal.

According to this configuration of the aspect of the invention, in the period from when the transmission of the first image data and the second image data from the display device to the third terminal is started to when the transmission is completed, periods in which the transmission of the data is not performed are disposed periodically. Thus, in the period from when the transmission of the first data and the second data is started to when the transmission is completed, the period in which the device connected to the network can perform the communication via the network without being affected by the transmission of the first data and the second data by the display device appears periodically, and it is possible to keep the state in which the smooth communication via the network can be achieved.

In the aspect of the invention, the display device may further include a combining section adapted to generate image data of the composite image based on the first data received from the first terminal, and the second data received from the second terminal, and the third display section may display the composite image based on the image data of the composite image generated by the combining section.

According to this configuration of the aspect of the invention, regarding the display system in which the display device receives the data from a plurality of terminals, and then display the composite image including the images corresponding to the images displayed on the plurality of terminals based on the data received, the communication load of the network can be reduced.

In the aspect of the invention, the display device may additionally notify the first terminal and the second terminal of information related to orders of the respective terminals when requesting the transmission of the first data and the second data, and the first terminal and the second terminal may make timings of transmitting the data different from each other so that the timings of transmitting the data are shifted from each other in accordance with the orders of the respective terminals based on the information related to the orders of the terminals.

According to this configuration of the aspect of the invention, it is possible for the first terminal and the second terminal to efficiently and reliably make the timings of transmitting the first data and the second data different from each other using the information related to the orders of the terminals.

In the aspect of the invention, the first data may be image data of a thumbnail image of the first image, and the second data may be image data of a thumbnail image of the second image.

According to this configuration of the aspect of the invention, regarding the display system in which the plurality of terminals transmits the image data of the thumbnail images of the images displayed on the respective terminals in accordance with the request from the display device, the communication load of the network can be reduced.

Another aspect of the invention is directed to a display device capable of communicating with a first terminal and a second terminal via a network including a control section configured to request the first terminal to transmit first data corresponding to a first image to be displayed by the first terminal, request the second terminal to transmit second data corresponding to a second image to be displayed by the second terminal, and notify the first terminal of information necessary for the first terminal to transmit the first data at a timing different from a timing at which the second terminal transmits the second data, and a communication section configured to receive the first data from the first terminal and the second data from the second terminal at the timings different from each other.

According to the configuration of this aspect of the invention, when the first terminal and the second terminal transmit the first data and the second data to the display device in accordance with the request from the display device, it is possible to prevent the plurality of terminals from transmitting the data to the display device at the same time, and thus, the communication load of the network can be reduced.

Another aspect of the invention is directed to a method of controlling a display system having a first terminal, a second terminal, and a display device capable of communicating with the first terminal and the second terminal via a network, the method including requesting, by the display device, the first terminal to transmit first data corresponding to a first image to be displayed by the first terminal, requesting, by the display device, the second terminal to transmit second data corresponding to a second image to be displayed by the second terminal, transmitting, by the first terminal, the first data in accordance with the request from the display device at a timing different from a timing at which the second terminal transmits the second data, transmitting, by the second terminal, the second data in accordance with the request from the display device at the timing different from the timing at which the first terminal transmits the first data, and receiving, by the display device, the first data from the first terminal and the second data from the second terminal at the timings different from each other.

According to the configuration of this aspect of the invention, when the first terminal and the second terminal transmit the first data and the second data to the display device in accordance with the request from the display device, it is possible to prevent the plurality of terminals from transmitting the data to the display device at the same time, and thus, the communication load of the network can be reduced.

BRIEF DESCRIPTION OF THE DRAWINGS

The invention will be described with reference to the accompanying drawings, wherein like numbers reference like elements.

FIG. 6 is a diagram showing a content of terminal list information.

DESCRIPTION OF EXEMPLARY EMBODIMENTS

Some embodiments of the invention will hereinafter be described with reference to the accompanying drawings.

Figure 1:
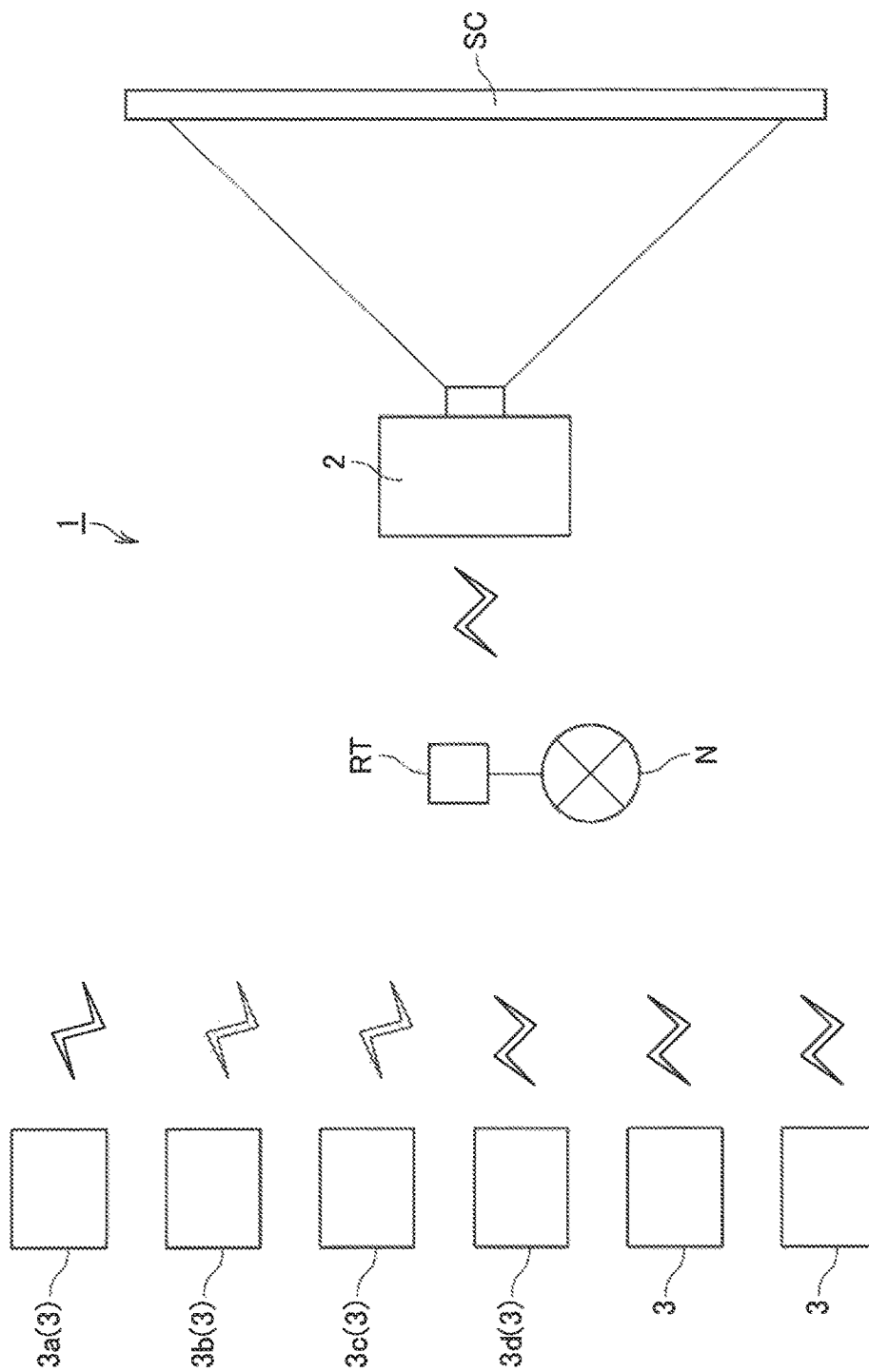
FIG. 1 is a diagram showing a display system according to an embodiment of the invention.

FIG. 1 is a diagram showing a display system 1 according to the present embodiment.

As shown in FIG. 1, the display system 1 is provided with a projector 2 (a display device) and a plurality of tablet terminals 3 (terminals).

The projector 2 is a display device having a function of receiving image data from an external device and then projecting light on a screen SC based on the image data to display the image.

The tablet terminals 3 are each a terminal having a plate-like (tablet-type) housing and provided with a touch panel disposed in a broad area on a front surface of the housing. The tablet terminals 3 are each, for example, a smartphone functioning as a cellular phone, and further, for example, a tablet-type computer not provided with a function as a phone.

It is possible for the projector 2 and the plurality of tablet terminals 3 to communicated with each other using wireless communication via a communication network N (a network) configured including a wireless LAN router RT (FIG. 2) having a function as a router and a function as an access point. The projector 2 and the plurality of tablet terminals perform wireless communication compliant with a communication standard (e.g., Wi-Fi (registered trademark)) related to the wireless LAN via the communication network N.

When displaying an image on the screen SC, the projector 2 has the following function.

Specifically, the projector 2 has a function of receiving image data related to a composite image including thumbnail images of the images respectively displayed on the touch panels of the plurality of tablet terminals 3 from the tablet terminal 3 functioning as a main terminal (described later), and then displaying the composite image on the screen SC based on the image data thus received. The thumbnail image denotes an image obtained by reducing the image displayed on the tablet terminals 3 in a predetermined manner.

The display system 1 is used in, for example, the following manner.

That is, in a lesson held by a teacher and a plurality of students in a school such as a university or a high-school, the tablet terminals 3 are respectively delivered to the students. The student makes the tablet terminal 3 display an image related to a material such as a report as homework. The teacher operates the tablet terminal 3 functioning as the main terminal (described later) as needed using the method described later to make the projector 2 display the thumbnail images related to the images displayed on specific ones of the tablet terminals 3 on the screen SC. The teacher gives the lesson using the plurality of thumbnail images displayed on the screen SC. For example, the teacher proceeds with the lesson while pointing to specific one of the thumbnail images displayed on the screen SC, or making a comparative review of a content of one of the thumbnail images and a content of another of the thumbnail images.

Further, for example, in the presentation performed by a presenter, the presenter prepares the plurality of tablet terminals 3 in advance. The presenter makes the tablet terminals 3 display respective images related to materials different from each other in advance. For example, the presenter makes one of the tablet terminals 3 display the image related to a picture used for the presentation, and makes the rest of the tablet terminals 3 display images related to diagrams used for the presentation. The presenter operates the tablet terminal 3 functioning as the main terminal (described later) as needed using the method described later to make the projector 2 display the thumbnail images related to the images displayed on specific ones of the tablet terminals on the screen SC. The presenter proceeds with the presentation while pointing to specific one of the thumbnail images displayed on the screen SC, or making a comparative review of a content of one of the thumbnail images and a content of another of the thumbnail images.

As described above, the display system 1 can be used in the circumstance in which an advantageous result can be obtained by displaying the thumbnail images related to the images displayed on the plurality of tablet terminals 3 at the same time on the screen SC.

Figure 2:
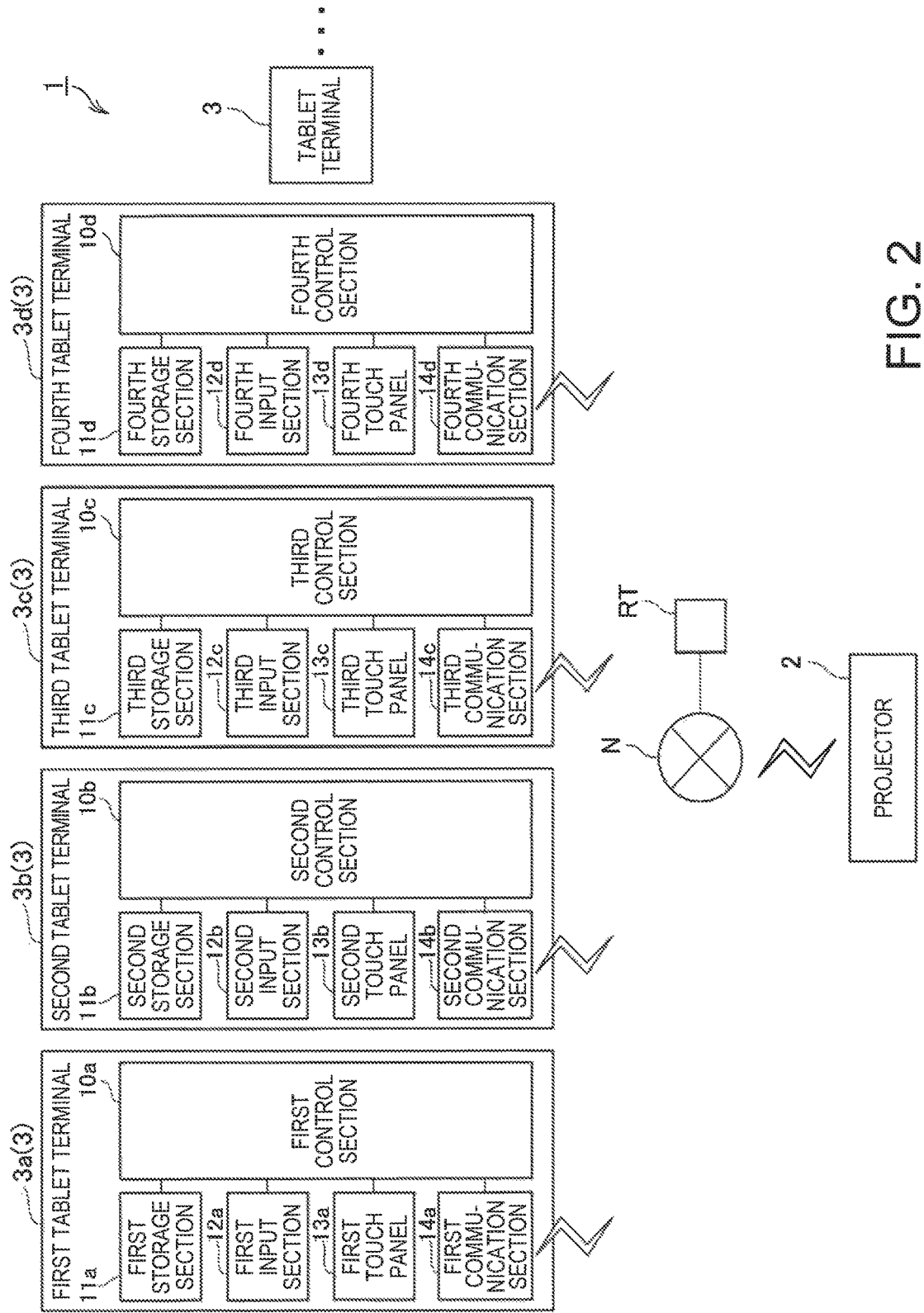
FIG. 2 is a block diagram showing a functional configuration of a tablet terminal.

FIG. 2 is a block diagram showing a functional configuration of the tablet terminals 3 provided to the display system 1.

In FIG. 2, regarding the tablet terminals 3, there is shown the functional configuration of four tablet terminals 3, namely a first tablet terminal 3a (a first terminal), a second tablet terminal 3b (a second terminal), a third tablet terminal 3c, and a fourth tablet terminal 3d (a third terminal), among the plurality of tablet terminals 3 connected to the projector 2 via the communication network N.

As described above, the projector 2 and the tablet terminals 3 are connected to each other so as to communicate with each other via the communication network N. In the present embodiment, the communication network N is a network related to the wireless LAN, and the communication is performed between the devices connected to the communication network N using the communication standard related to the wireless LAN. It should be noted that the communication network N is not limited to the network related to the wireless LAN, but can also be a network related to wired communication, and any communication standard can be adopted as the communication standard achieved via the communication network N. In other words, the communication network N is only required to be a network with which the bidirectional communication can be achieved between the devices.

As shown in FIG. 2, the first tablet terminal 3a is provided with a first control section 10a, a first storage section 11a, a first input section 12a, a first touch panel 13a (a first display section), and a first communication section 14a (a first communication section).

The first control section 10a is provided with a CPU for executing a predetermined program to control each section of the first tablet terminal 3a, a ROM for storing the program executed by the CPU, data related to the program, and so on in a nonvolatile manner, a RAM for temporarily storing the program executed by the CPU and the data, an ASIC for performing a predetermined process, a peripheral device used for a predetermined purpose, and so on.

The first storage section 11a has a nonvolatile memory, and stores a variety of types of data. In the first tablet terminal 3a, there is installed a dedicated application AP having a function described later, and in the first storage section 11a, there is stored the dedicated application AP. The dedicated application AP is, for example, an application provided by the manufacturer manufacturing the projector 2, and is installed in advance by the user using a predetermined download service.

The first input section 12a is provided with an operation switch disposed on a housing of the first tablet terminal 3a, and detects the operation to the operation switch and then outputs the operation thus detected to the first control section 10a. The first control section 10a performs a process corresponding to the operation based on the input from the first input section 12a.

The first touch panel 13a is a touch panel disposed in abroad area on the front surface of the housing of the first tablet terminal 3a. The first touch panel 13a is provided with a display panel such as a liquid crystal display panel or an organic EL panel, and a touch sensor disposed so as to overlap the display panel. The first touch panel 13a displays an image on the display panel under the control of the first control section 10a. The touch sensor detects a contact operation to the first touch panel 13a to output the contact operation thus detected to the first control section 10a. The first control section 10a performs a process corresponding to the contact operation based on the input from the touch sensor.

The first communication section 14a is provided with a wireless communication module compatible with a communication standard related to the wireless LAN such as Wi-Fi, and other constituents related to the wireless communication, and communicates with an external device connected to the communication network N in accordance with the communication standard related to the wireless LAN under the control of the first control section 10a. It should be noted that the information (e.g., an SSID of a wireless router RT and a pass key used in the communication with the wireless LAN router RT in the case in which the standard used in the communication is Wi-Fi) necessary for the communication via the communication network N is registered in advance.

The second tablet terminal 3b is a tablet terminal 3 the same in model as the first tablet terminal 3a, and has the same configuration as that of the first tablet terminal 3a.

As shown in FIG. 2, the second tablet terminal 3b is provided with a second control section 10b, a second storage section 11b, a second input section 12b, a second touch panel 13*b* (a second display section), and a second communication section 14*b* (a second communication section).

The second control section 10*b* corresponds to the first control section 10*a*, the second storage section 11*b* corresponds to the first storage section 11*a*, the second input section 12*b* corresponds to the first input section 12*a*, the second tough panel 13*b* corresponds to the first touch panel 13*a*, and the second communication section 14*b* corresponds to the first communication section 14*a*.

The third tablet terminal 3*c* is a tablet terminal 3 the same in model as the first tablet terminal 3*a*, and has the same configuration as that of the first tablet terminal 3*a*.

As shown in FIG. 2, the third tablet terminal 3*c* is provided with a third control section 10*c*, a third storage section 11*c*, a third input section 12*c*, a third touch panel 13*c*, and a third communication section 14*c*.

The third control section 10*c* corresponds to the first control section 10*a*, the third storage section 11*c* corresponds to the first storage section 11*a*, the third input section 12*c* corresponds to the first input section 12*a*, the third tough panel 13*c* corresponds to the first touch panel 13*a*, and the third communication section 14*c* corresponds to the first communication section 14*a*.

The fourth tablet terminal 3*d* is a tablet terminal 3 the same in model as the first tablet terminal 3*a*, and has the same configuration as that of the first tablet terminal 3*a*.

As shown in FIG. 2, the fourth tablet terminal 3*d* is provided with a fourth control section 10*d*, a fourth storage section 11*d*, a fourth input section 12*d*, a fourth touch panel 13*d*, and a fourth communication section 14*d*.

The fourth control section 10*d* corresponds to the first control section 10*a*, the fourth storage section 11*d* corresponds to the first storage section 11*a*, the fourth input section 12*d* corresponds to the first input section 12*a*, the fourth tough panel 13*d* corresponds to the first touch panel 13*a*, and the fourth communication section 14*d* corresponds to the first communication section 14*a*.

In the tablet terminals 3 including the second tablet terminal 3*b*, the third tablet terminal 3*c*, and the fourth tablet terminal 3*d*, and connected to the projector 2, there is installed the dedicated application AP in advance similarly to the first tablet terminal 3*a*.

Figure 3:
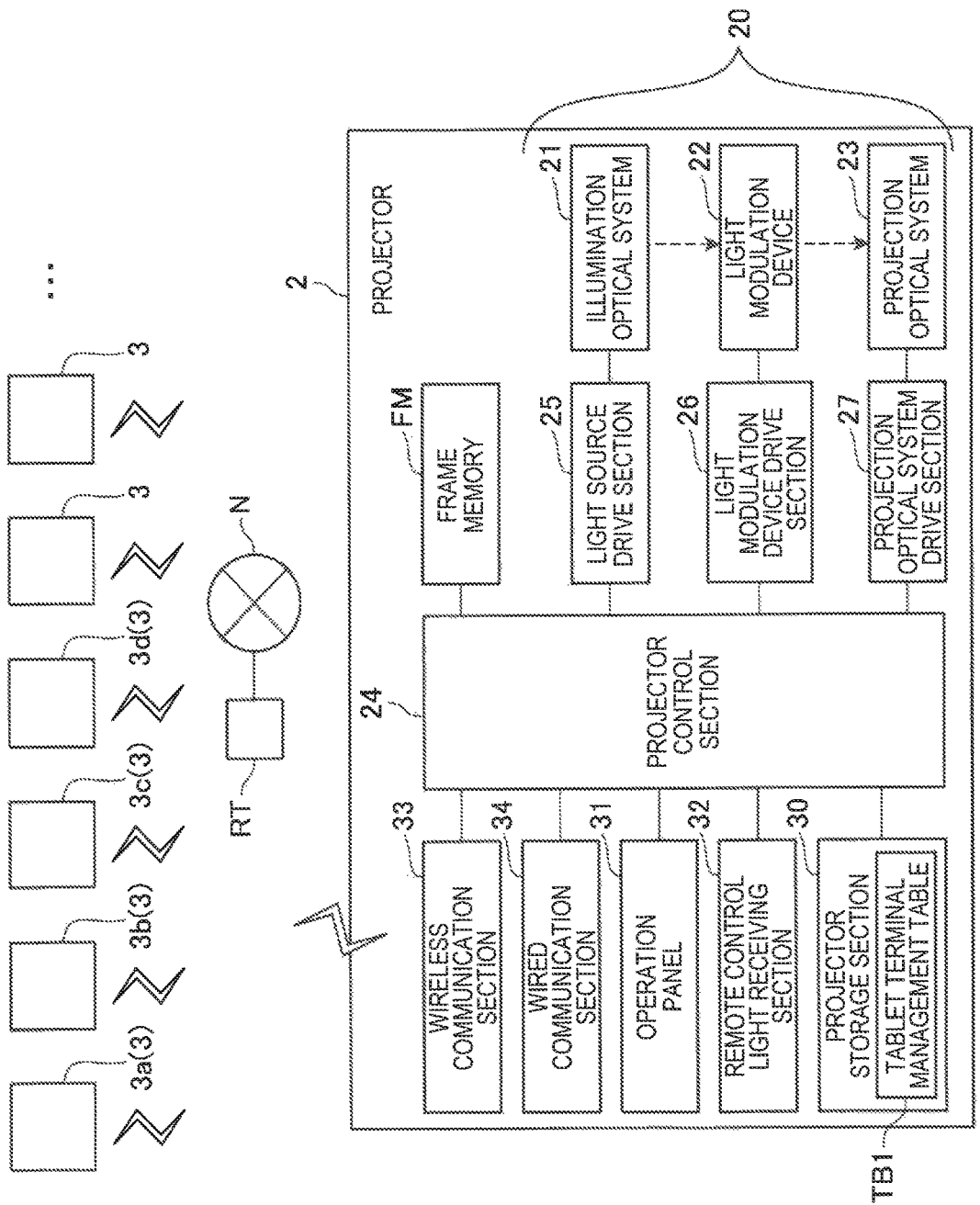
FIG. 3 is a block diagram showing a functional configuration of a projector.

FIG. 3 is a block diagram showing a functional configuration of the projector 2.

As shown in FIG. 3, the projector 2 is provided with a projection section 20 (a third display section) for performing display of an image on the screen SC. The projection section 20 is provided with an illumination optical system 21, a light modulation device 22, and a projection optical system 23.

The illumination optical system 21 is provided with a light source such as a xenon lamp, a super-high pressure mercury lamp, an LED (light emitting diode), of a laser source, and a reflector for guiding the light emitted by the light source to the light modulation device 22. The light emitted by the light source of the illumination optical system 21 enters the light modulation device 22 via the reflector. It should be noted that the illumination optical system 21 can also have a configuration provided with a lens group, a polarization plate, and so on for improving the optical characteristics of the light projected by the projector 2, or can also have a configuration provided with a dimming element for reducing the light intensity of the light emitted by the light source on a path leading to the light modulation device 22.

The light modulation device 22 modulates the light entering the light modulation device 22 from the illumination optical system 21, and then emits the light thus modulated to the projection optical system 23. Specifically, the light modulation device 22 is provided with three transmissive liquid crystal panels corresponding respectively to the colors of RGB. The light entering the light modulation device 22 from the illumination optical system 21 is separated by dichroic mirrors and so on into colored light beams of R, G, and B, and then the colored light beams enter the liquid crystal panels of the respective colors. The liquid crystal panels of the respective colors modulate the light beams of respective colors thus entering the liquid crystal panels, and then emit the result to a cross dichroic prism. The cross dichroic prism combines the light beams entering the cross dichroic prism from the liquid crystal panels of the respective colors, and then emits the result to the projection optical system 23 as image light.

The projection optical system 23 is provided with a lens group for guiding the image light, which has been input from the light modulation device 22, toward the screen SC to form the image on the screen SC. Further, the projection optical system 23 is also provided with a zoom mechanism for performing expansion/contraction of the image displayed on the screen SC, and a focus adjustment mechanism for performing an adjustment of the focus.

Further, as shown in FIG. 3, the projector 2 is provided with a projector control section 24, a light source drive section 25, a light modulation device drive section 26, and a projection optical system drive section 27.

The projector control section 24 is provided with a CPU for executing a predetermined program to control each section of the projector 2, a ROM for storing the program executed by the CPU, data related to the program, and so on in a nonvolatile manner, a RAM for temporarily storing the program executed by the CPU and the data, an ASIC for performing a predetermined process, a peripheral device used for a predetermined purpose, and so on.

The projector control section 24 controls the light source drive section 25 to drive the illumination optical system 21. Further, the projector control section 24 controls the light modulation device drive section 26 to drive the light modulation device 22. Further, the projector control section 24 controls the projection optical system drive section 27 to control the projection optical system 23.

Further, as shown in FIG. 3, the projector 2 is provided with a projector storage section 30, an operation panel 31, a remote control light receiving section 32, a wireless communication section 33 (a third communication section), and a wired communication section 34.

The projector storage section 30 is provided with a nonvolatile memory, and stores a variety of types of data. The projector storage section 30 stores a tablet terminal management table TB1. The tablet terminal management table TB1 will be described later.

The operation panel 31 is provided with an operation switch for the user to perform an operation, indicator lamps for announcing a variety of types of information such as an operation state of the projector 2, a setting state, or presence or absence of occurrence of an error, and so on. The operation panel 31 detects an operation to the operation switch, and then outputs the operation thus detected to the projector control section 24. The projector control section 24 performs the process corresponding to the operation to the operation switch based on the input from the operation panel 31. Further, the projector control section 24 controls the operation panel 31 to put on and off the indicator lamps in a predetermined manner.

The remote control light receiving section 32 receives light of an infrared signal transmitted from the remote controller (not shown), decodes the infrared signal thus received to generate data representing a content of an operation to the remote controller, and then outputs the data to the projector control section 24. The projector control section 24 performs the process corresponding to the operation to the remote controller based on the input from the remote control light receiving section 32.

The wireless communication section 33 is provided with a wireless communication module compatible with a communication standard related to the wireless LAN such as Wi-Fi, and other constituents related to the wireless communication, and communicates with an external device connected to the communication network N in accordance with the communication standard related to the wireless LAN under the control of the projector control section 24. It should be noted that the information (e.g., an SSID of a wireless router RT and a pass key used in the communication with the wireless LAN router RT in the case in which the standard used in the communication is Wi-Fi) necessary for the communication via the communication network N is registered in advance.

The wired communication section 34 is provided with a communication interface compatible with a communication standard such as USB, Ethernet (registered trademark), IEEE 1394, MHL (registered trademark), HDMI (registered trademark), or DisplayPort, and communicates with an external device connected via a cable compatible with the communication standard under the control of the projector control section 24.

It should be noted that in the present embodiment, the projector 2 has the wireless communication function. It should be note that it is also possible to adopt a configuration in which the wireless communication function isnot implemented in the projector 2 itself, but, for example, a wireless adapter such as a wireless LAN adapter as a USB device is connected to the projector 2, and the projector 2 performs the wireless communication using the wireless adapter. In this case, the driver for the wireless adapter to be connected to the projector 2 is installed in the projector 2 in advance.

Further, although in the present embodiment, there is described the case in which the tablet terminals 3 supply the projector 2 with the image data in the display of the image by the projector 2, it is also possible for the projector 2 to display images in response to supply of the image data from other devices. As the device for supplying the projector 2 with the image data, there can be cited, for example, a video output device such as a video playback device, a DVD playback device, a television tuner device, a set-top box of CATV, or a video game device, and a personal computer.

Under the configuration described hereinabove, the projector 2 displays the image based on the image data on the screen SC using the following method based on the image data received from external devices including the tablet terminals 3.

Specifically, the projector control section 24 of the projector 2 performs a resolution conversion process for converting the image data input from the external devices into data with the resolution compliant with the specification of the liquid crystal panels of the light modulation device 22, and so on, and then develops the result in a frame memory FM. The projector control section 24 controls the light modulation device drive section 26 to drive the light modulation device 22 based on the data thus developed in the frame memory FM. Thus, the image is drawn on the liquid crystal panels of the respective colors of the light modulation device 22, and is then projected on the screen SC as the projection image via the projection optical system 23.

Further, the projector control section 24 appropriately control the light source drive section 25 to change the output of the light source to thereby change the luminance of the image to be displayed on the screen SC in accordance with an instruction to the operation panel 31 and an instruction to the remote controller. Further, the projector control section 24 appropriately control the projection optical system drive section 27 to perform the expansion/contraction of the image displayed on the screen SC and the adjustment of the focus in accordance with an instruction to the operation panel 31 and an instruction to the remote controller.

Then, the operations of the respective devices of the display system 1 in the case in which the projector 2 displays a composite image, which includes the thumbnail images of the images displayed on the plurality of tablet terminals 3, on the screen SC will be described.

There is hereinafter assumed the state in which the four tablet terminals 3, namely the first tablet terminal 3a, the second tablet terminal 3b, the third tablet terminal 3c, and the fourth tablet terminal 3d, are connected to the projector 2 so as to be able to communicate via the communication network N. Further, there is assumed the state in which one or more tablet terminals 3 are connected to the projector 2 so as to be able to communicate via the communication network N besides the four tablet terminals 3. For example, in the state, 20 tablet terminals 3 are connected to the projector 2 in addition to the four tablet terminals 3.

In the display of the composite image by the projector 2, each of the tablet terminals 3 connected to the projector 2 is powered ON to start up the dedicated application AP.

Further, one of the tablet terminals 3 connected to the projector 2 is set to a main terminal. Setting of the tablet terminal 3 to the main terminal is performed by performing predetermined input to a predetermined user interface provided by the dedicated application AP.

In the case in which, for example, the display system 1 is used for the lesson described above citing an example, the teacher operates the own tablet terminal 3 to set the tablet terminal 3 to the main terminal. Further, in the case in which, for example, the display system 1 is used for the presentation described above citing an example, the presenter operates one of the tablet terminals 3 to set the tablet terminal 3 to the main terminal.

In the following description, it is assumed that the fourth tablet terminal 3d is the tablet terminal 3 set to the main terminal.

Further, in the following description, the user who operates the tablet terminal 3 set to the main terminal is particularly referred to as a "main user."

Figure 4:
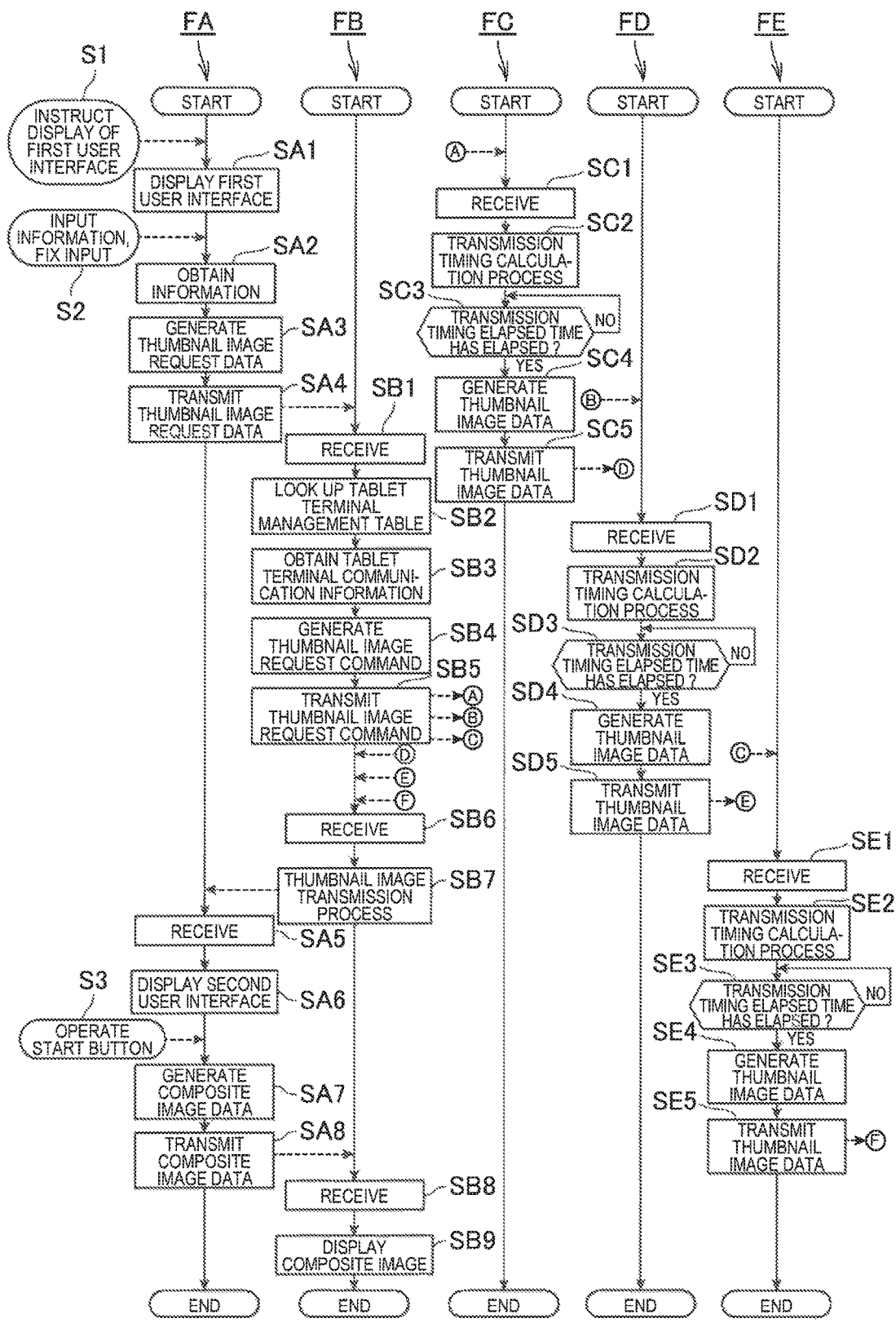
FIG. 4 is a flowchart showing operations of the respective devices constituting the display system.

In FIG. 4, the flowchart FA is a flowchart showing an operation of the fourth tablet terminal 3d set to the main terminal. The flowchart FB is a flowchart showing an operation of the projector 2. The flowchart FC is a flowchart showing an operation of the first tablet terminal 3a. The flowchart FD is a flowchart showing an operation of the second tablet terminal 3b. The flowchart FE is a flowchart showing an operation of the third tablet terminal 3c.

In FIG. 4, the first tablet terminal 3a, the second tablet terminal 3b, the third tablet terminal 3c, and the fourth tablet terminal 3d perform the processes due to the functions of the dedicated application AP and other accompanying programs.

As shown in the flowchart of FIG. 4, the main user performs a predetermined operation to the fourth tablet terminal 3d to instruct (step S1) to display a first user interface UI1 for performing setting related to the composite image by the projector 2.

In accordance with the instruction in the step S1, the fourth control section 10d of the fourth tablet terminal 3d displays (step SA1) the first user interface UI1 on the fourth touch panel 13d.

Figure 5:
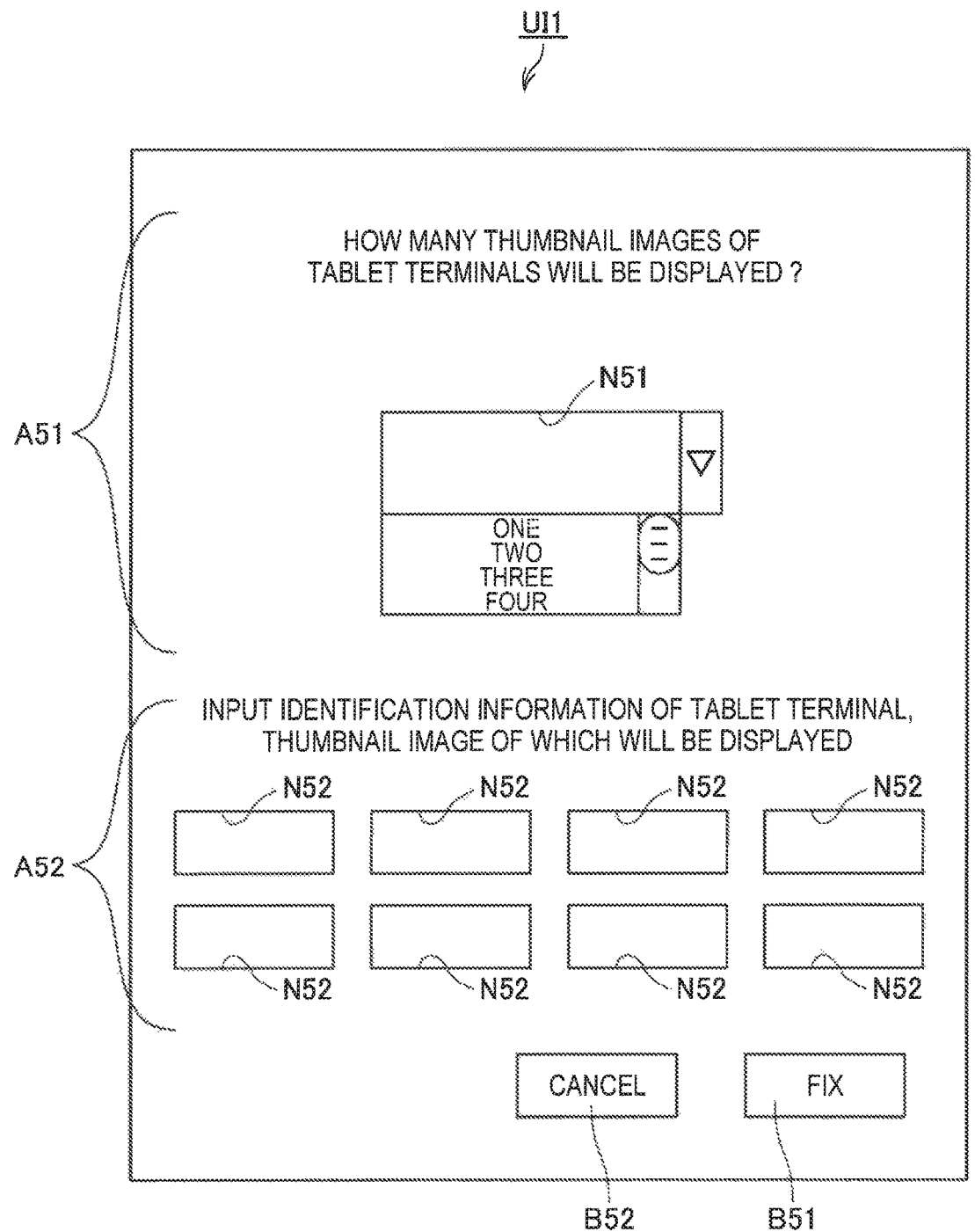
FIG. 5 is a diagram showing a first user interface.

FIG. 5 is a diagram showing the first user interface UI1.

As shown in FIG. 5, the first user interface UI1 has an area A51 and an area A52.

The area A51 is an area to which information representing the number (hereinafter referred to as the "number of thumbnail images") of the tablet terminals 3, the thumbnail images of which are displayed by the projector 2, is input, and has a number-of-thumbnail images input field N51 to which the information representing the number of the thumbnail images is input. The number-of-thumbnail images input field N51 is provided with a pull-down menu, and it is possible for the main user to input the information representing the number of the thumbnail images to the number-of-thumbnail images input field N51 by selecting one from information items displayed in the pull-down menu. In the present embodiment, the range of the number of the thumbnail images is a range of 1 through 8.

The area A52 is an area to which identification (hereinafter referred to as "tablet terminal identification information") of the tablet terminals 3, the thumbnail images of which are displayed by the projector 2, and has tablet terminal identification information input fields N52 to which the tablet terminal identification information is input.

The main user inputs the tablet terminal identification information to one or more tablet terminal identification information input fields N52 in accordance with the number of the thumbnail images.

The fourth control section 10d gets the main terminal into the state in which the tablet terminal information can be input to the input fields corresponding to the number of the thumbnail images out of the tablet terminal identification information input fields N52 provided to the area A52 based on the number of the thumbnail images represented by the information input to the number-of-thumbnail images input field N51.

The tablet terminal identification information is set to each of the tablet terminals 3 connected to the projector 2 in advance.

As shown in FIG. 5, the first user interface UI1 has a fixation button B51 for fixing the input to the user interface, and a cancel button B52 for canceling the input. In the case of fixing the input to the first user interface UI1, the user operates (step S2) the fixation button B51.

In the following description, the operations of the respective devices in the display system 1 will be described using the case as an example, in which the main user inputs the information representing 3 to the number-of-thumbnail images input field N51, and inputs the tablet terminal identification information of the first tablet terminal 3a, the second tablet terminal 3b, and the third tablet terminal 3c to the respective tablet terminal identification information input fields N52.

When the fourth control section 10d detects that the fixation button B51 of the first user interface UI1 has been operated, the fourth control section 10d obtains (step SA2) the information input to each of the input fields of the user interface.

Then, the fourth control section 10d generates (step SA3) thumbnail image request data based on the information obtained in the step SA2.

The thumbnail image request data denotes the data for requesting transmission of the image data (hereinafter referred to as "thumbnail image data") related to the thumbnail image of the image displayed on the tablet terminal 3 to the tablet terminal 3 corresponding to the tablet terminal identification information designated by the user. The thumbnail image request data includes at least the information for requesting the transmission of the thumbnail image data, and the tablet terminal identification information obtained in the step SA2.

Then, the fourth control section 10d controls the fourth communication section 14d to transmit (step SA4) the thumbnail image request data generated in the step SA3 to the projector 2.

As shown in the flowchart FB in FIG. 4, the projector control section 24 of the projector 2 controls the wireless communication section 33 to receive (step SB1) the thumbnail image request data.

Then, the projector control section 24 looks up (step SB2) the tablet terminal management table TB1.

The tablet terminal management table TB1 is a table in which the tablet terminal identification information and tablet terminal communication information associated with each other for each of the tablet terminals 3 connected to the projector 2 via the communication network N. The tablet terminal information is information related to communication necessary for the projector 2 to transmit data to the tablet terminals 3. The tablet terminal communication information includes the IP address and the MAC address of the tablet terminal 3.

The projector 2 generates the tablet terminal management table TB1 using the following method.

That is, when generating the tablet terminal management table TB1, the user powers ON each of the tablet terminals 3 to start up the dedicated application AP. Subsequently, the user performs a predetermined operation on the projector 2 to thereby instruct the generation of the tablet terminal management table TB1. The projector control section 24 of the projector 2 transmits a command for requesting transmission of a combination of the tablet terminal identification information and the tablet terminal communication information to each of the tablet terminals 3 connected to the communication network N by broadcasting in accordance with the instruction by the user. Each of the tablet terminals 3 transmits the data including the combination of the own tablet terminal identification information and the own tablet terminal communication information in response to the reception of the command using the function of the dedicated application AP. The projector control section 24 of the projector 2 generates the tablet terminal management table TB1 based on the data thus received.

It should be noted that the method of generating the tablet terminal management table TB1 is not limited to the method described above, but it is possible to adopt a configuration in which, for example, the user inputs necessary information to the projector 2 using a predetermined measure, and the projector control section 24 generates the tablet terminal management table TB1 based on the information thus input.

After looking up the tablet terminal management table TB1, the projector control section 24 obtains (step SB3) the tablet terminal communication information associated with the tablet terminal identification information included in the thumbnail image request data received in the step SB1 based on the tablet terminal management table TB1.

In the present embodiment, in the step SB3, the projector control section 24 obtains the tablet terminal communication information of each of the first tablet terminal 3a, the second tablet terminal 3b, and the third tablet terminal 3c.

Then, the projector control section 24 generates (step SB4) the thumbnail image request command. The thumbnail image request command is a command for requesting transmission of the thumbnail image data related to the image presently displayed to the tablet terminal 3.

The thumbnail image request command includes information of requesting transmission of the thumbnail image data related to the image presently displayed, and terminal list information.

The terminal list information is information having the tablet terminal identification information included in the thumbnail image request data received in the step SB1 and information representing the serial numbers (numbers in an ascending order starting with "first") so as to be associated with each other. The projector control section 24 provides the tablet terminal identification information with the respective serial numbers to generate the terminal list information. For example, in the case in which there are 10 pieces of tablet terminal identification information, the projector control section 24 provides the 10 pieces of tablet terminal identification information respectively with serial numbers of "first" through "10-th," and generates the terminal list information having the information representing the serial number and the tablet terminal identification information associated with each other for each of the 10 pieces of tablet terminal identification information.

FIG. 6 is a diagram showing a content of the terminal list information according to the present embodiment.

As shown in FIG. 6, in the terminal list information according to the present embodiment, the information representing the serial number "first" and the tablet terminal identification information of the first tablet terminal 3a are associated with each other, the information representing the serial number "second" and the tablet terminal identification information of the second tablet terminal 3b are associated with each other, and the information representing the serial number "third" and the tablet terminal identification information of the third tablet terminal 3c are associated with each other.

Then, the projector control section 24 transmits (step SB5) the thumbnail image request command generated in the step SB4 to the tablet terminals 3 based on the tablet terminal communication information obtained in the step SB3.

In the present embodiment, in the step SB5, the projector control section 24 transmits the thumbnail image request command to each of the first tablet terminal 3a, the second tablet terminal 3b, and the third tablet terminal 3c.

As described above, in the present embodiment, when displaying the composite image, the projector 2 does not request the transmission of the thumbnail image data to all of the tablet terminals 3, but requests the transmission of the thumbnail image data only to the tablet terminal 3 to be the target the thumbnail image of which is displayed by the projector 2. Thus, it is possible to prevent the data from being unnecessarily transmitted/received between the projector 2 and the tablet terminals 3, reduce the data amount of the data transmitted/received via the communication network N, and reduce the communication load of the communication network N.

Here, it is assumed in the present embodiment that the first tablet terminal 3a, the second tablet terminal 3b, and the third tablet terminal 3c are in the state of displaying the following images, respectively.

Figure 7C:
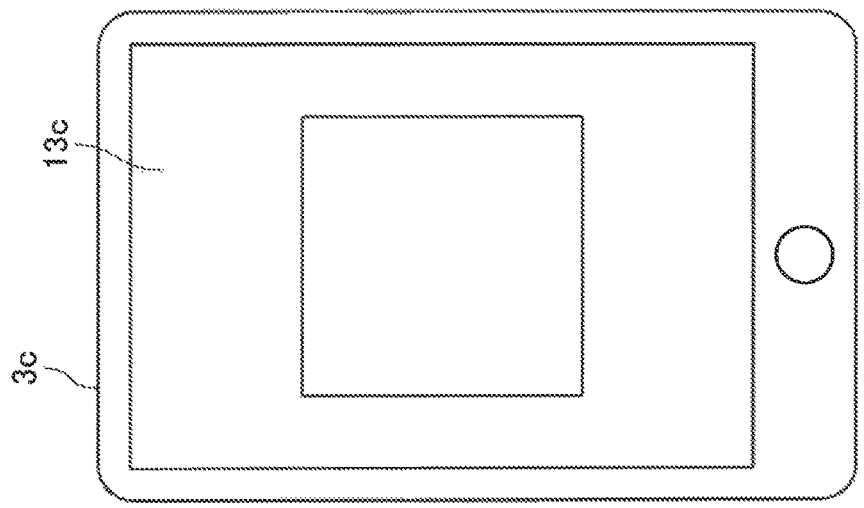
FIG. 7C is a diagram showing an image displayed by a third tablet terminal.
Figure 7B:
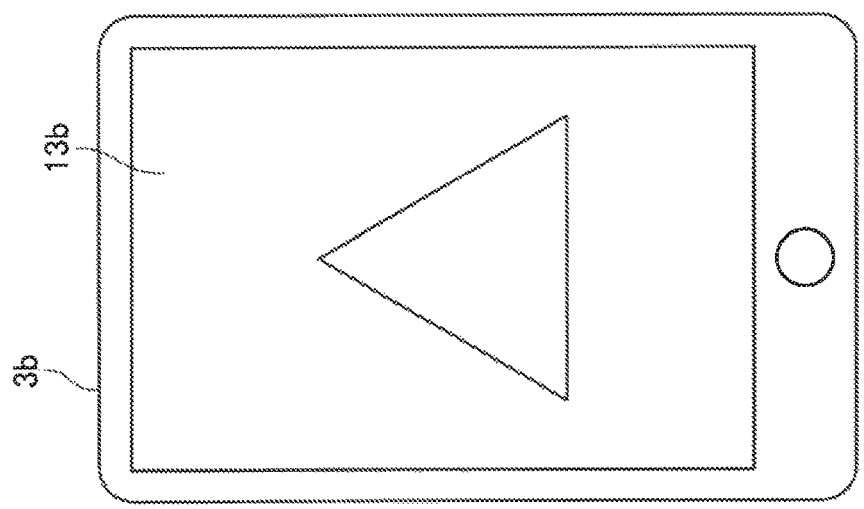
FIG. 7B is a diagram showing an image displayed by a second tablet terminal.
Figure 7A:
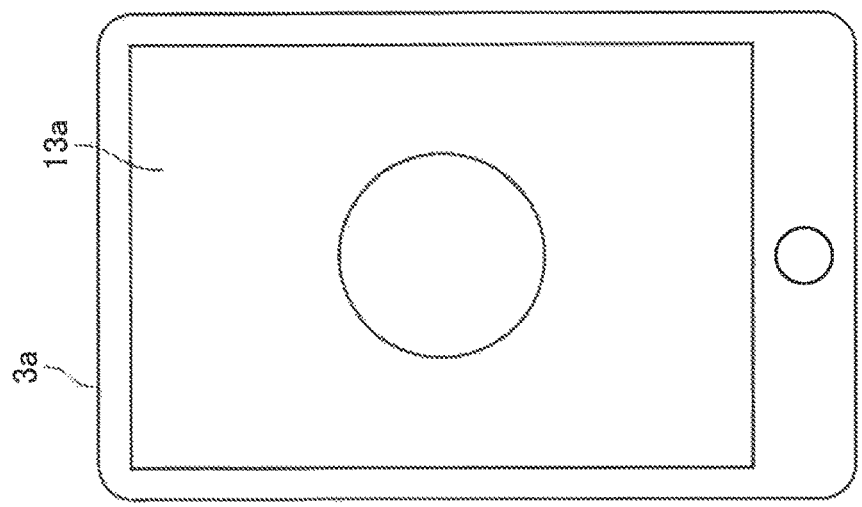
FIG. 7A is a diagram showing an image displayed by a first tablet terminal.

FIG. 7A is a diagram showing the image displayed by the first tablet terminal 3a together with the housing of the first tablet terminal 3a. As shown in FIG. 7A, the first tablet terminal 3a is in the state of displaying the image showing a circle. The image shown in FIG. 7A corresponds to a "first image."

FIG. 7B is a diagram showing the image displayed by the second tablet terminal 3b together with the housing of the second tablet terminal 3b. As shown in FIG. 7B, the second tablet terminal 3b is in the state of displaying the image showing a triangle. The image shown in FIG. 7B corresponds to a "second image."

FIG. 7C is a diagram showing the image displayed by the third tablet terminal 3c together with the housing of the third tablet terminal 3c. As shown in FIG. 7C, the third tablet terminal 3c is in the state of displaying the image showing a rectangle.

As shown in the flowchart FC in FIG. 4, the first control section 10a of the first tablet terminal 3a controls the first communication section 14a to receive (step SC1) the thumbnail image request command.

Then, the first control section 10a performs (step SC2) a transmission timing calculation process.

The transmission timing calculation process is a process of calculating transmission timing elapsed time (described later).

In the detailed description of the process in the step SC2, the first control section 10a obtains the terminal list information included in the thumbnail image request command received in the step SC1. Then, the first control section 10a obtains the information representing the serial number associated with the own tablet terminal identification information based on the terminal list information. In the present embodiment, the first control section 10a obtains the information representing the serial number "first." Then, the first control section 10a calculates the transmission timing elapsed time using the following formula S1.

"transmission timing elapsed time"=("serial number"−"1")×"delay unit time" (Formula S1):

Here, the transmission timing elapsed time denotes the elapsed time required from when the thumbnail image request command is received to when the thumbnail image data is transmitted. After the transmission timing elapsed time has elapsed from the timing when the thumbnail image request command has been received, the first control section 10a transmits the thumbnail image data.

Further, the delay unit time denotes a predetermined time. In the present embodiment, it is assumed that the delay unit time is "2 seconds." The purpose of the delay unit time will be described later.

In the present embodiment, due to the transmission timing calculation process in the step SC2, the first control section 10a calculates "0 second" as the transmission timing elapsed time.

Then, the first control section 10a receives the thumbnail image request command, and then monitors (step SC3) whether or not the transmission timing elapsed time has elapsed. In the present embodiment, since the transmission timing elapsed time related to the first tablet terminal 3a is "0 second," the first control section 10a immediately determines in the step SC3 that the transmission timing elapsed time has elapsed.

In the case in which the transmission timing elapsed time has elapsed (YES in the step SC3), the first control section 10a generates (step SC4) the thumbnail image data related to the image presently displayed. In the step SC4, the first control section 10a obtains the image data of the image presently displayed, and then performs existing image processing on the image data thus obtained to generate the thumbnail image data. The configuration (e.g., the resolution and the size) of the thumbnail image data to be generated is set in advance.

In the present embodiment, the first control section 10a generates the thumbnail image data related to the image (see FIG. 7A) showing the circle presently displayed.

Then, the first control section 10a transmits (step SC5) the thumbnail image data generated in the step SC4 to the projector 2.

The thumbnail image data transmitted by the first control section 10a in the step SC5 corresponds to "first data."

As shown in the flowchart FD in FIG. 4, the second control section 10b of the second tablet terminal 3b controls the second communication section 14b to receive (step SD1) the thumbnail image request command.

Then, the second control section 10b performs (step SD2) the transmission timing calculation process.

In the present embodiment, the serial number related to the second tablet terminal 3b is "second." Therefore, due to the transmission timing calculation process in the step SD2, the second control section 10b calculates "2 seconds" as the transmission timing elapsed time.

Then, the second control section 10b receives the thumbnail image request command, and then monitors (step SD3) whether or not the transmission timing elapsed time has elapsed.

In the case in which the transmission timing elapsed time ("2 seconds" in the present embodiment) has elapsed (YES in the step SD3), the second control section 10b generates (step SD4) the thumbnail image data related to the image presently displayed.

In the present embodiment, the second control section 10b generates the thumbnail image data related to the image (see FIG. 7B) showing the triangle presently displayed.

Then, the second control section 10b transmits (step SD5) the thumbnail image data generated in the step SD4 to the projector 2.

The thumbnail image data transmitted by the second control section 10b in the step SD5 corresponds to "second data."

As shown in the flowchart FE in FIG. 4, the third control section 10c of the third tablet terminal 3c controls the third communication section 14c to receive (step SE1) the thumbnail image request command.

Then, the third control section 10c performs (step SE2) the transmission timing calculation process.

In the present embodiment, the serial number related to the third tablet terminal 3c is "third." Therefore, due to the transmission timing calculation process in the step SE2, the third control section 10c calculates "4 seconds" as the transmission timing elapsed time.

Then, the third control section 10c receives the thumbnail image request command, and then monitors (step SE3) whether or not the transmission timing elapsed time has elapsed.

In the case in which the transmission timing elapsed time ("4 seconds" in the present embodiment) has elapsed (YES in the step SE3), the third control section 10c generates (step SE4) the thumbnail image data related to the image presently displayed.

In the present embodiment, the third control section 10c generates the thumbnail image data related to the image (see FIG. 7C) showing the rectangle presently displayed.

Then, the third control section 10c transmits (step SE5) the thumbnail image data generated in the step SE4 to the projector 2.

As described above, in the present embodiment, the tablet terminals 3 as the target of transmitting the thumbnail image data to the projector 2 do not transmit the thumbnail image data immediately in response to the reception of the thumbnail image request command, but transmit the thumbnail image data in a phased manner at timings shifted by the delay unit time. In the present embodiment, the first tablet terminal 3a transmits the thumbnail image data "0 second" after the reception of the thumbnail image request command, the second tablet terminal 3b transmits the thumbnail image data "2 seconds" after the reception, and the third tablet terminal 3c transmits the thumbnail image data "4 seconds" after the reception.

According to this configuration, the following advantages can be obtained. That is, it is possible to prevent the plurality of tablet terminals 3 from transmitting the thumbnail image data to the projector 2 at the same time. Thus, the communication load of the communication network N can be reduced, and it is possible to prevent that congestion occurs in the communication network N to cause a delay of the communication via the communication network N and a lost of the data transmitted/received via the communication network N.

It should be noted that the value of the delay unit time is set to an appropriate value reflecting the time required from when one of the tablet terminals 3 transmits the thumbnail image data to when the transmission is completed from the viewpoint of preventing the transmission of the thumbnail image data from being performed in a concentrated manner.

As shown in the flowchart FB in FIG. 4, the projector control section 24 controls the wireless communication section 33 to sequentially receive (step SB6) the thumbnail image data transmitted by one or more tablet terminals 3 (the first tablet terminal 3a, the second tablet terminal 3b, and the third tablet terminal 3c in the present embodiment) in a phased manner with intervals of the delay unit time. The thumbnail image data thus received is sequentially stored in a reception buffer (not shown).

The projector control section 24 performs (step SB7) a thumbnail image transmission process in accordance with the start of the reception of the thumbnail image data. The details are as follows.

Here, the thumbnail image transmission process denotes a process in which the projector 2 transmits the thumbnail image data, which has been received from the tablet terminals 3, to the tablet terminal 3 (the fourth tablet terminal 3d in the present embodiment) set as the main terminal.

In the thumbnail image transmission process, the projector control section 24 repeatedly performs transmission of the data constituting the thumbnail image data during transmission processing time (described later) and halt of the transmission of the thumbnail image data during transmission halt time (described later) to transmit all of the thumbnail image data having been received to the tablet terminal 3 set as the main terminal.

The transmission processing time is the time determined in advance as a period for transmitting the data constituting the thumbnail image data, and is, for example, "2 seconds." The transmission halt time is the time determined in advance as a period for halting the transmission of the thumbnail image data, and is, for example, "2 seconds."

Specifically, the projector control section 24 performs transmission of the data constituting the thumbnail image data having already been received during one transmission processing time, and regarding the data constituting the thumbnail image data having failed to be transmitted during the one transmission processing time, the state of being buffered in the reception buffer is kept. Then, the projector control section 24 waits without transmitting the thumbnail image data during the transmission halt time, and during the subsequent transmission processing time, the projector control section 24 performs the transmission of the data constituting the thumbnail image data as much as an amount which can be transmitted in the subsequent transmission processing time. As described above, the projector control section 24 repeatedly performs transmission of the data constituting the thumbnail image data during the transmission processing time and halt of the transmission of the thumbnail image data during the transmission halt time to transmit all of the thumbnail image data having been received to the tablet terminal 3 set as the main terminal.

Since such a process as described above is performed in the thumbnail image transmission process, the following advantage is obtained.

Specifically, in the case of adopting the configuration in which the projector control section 24 continues to perform the transmission of the thumbnail image data during the period until the transmission of all of the thumbnail image data is completed in accordance with the reception of the thumbnail image data from one or more tablet terminals 3, there is a problem described below. Specifically, in the period from when the projector control section 24 receives the thumbnail image data to when the projector control section 24 completes the transmission of the thumbnail image data, the communication load of the communication network N increases to hinder the communication of the device for performing the communication via the communication network N. Further, in the case in which the number of the tablet terminals 3 having transmitted the thumbnail image data to the projector 2 is large, the period from when the projector control section 24 has received the thumbnail image data to when the projector control section 24 completes the transmission of the thumbnail image data is protracted in some cases. As a result, according to the present embodiment, the transmission of the thumbnail image data from the projector 2 to the tablet terminal 3 related to the main terminal is performed intermittently, and the periods in which the transmission of the thumbnail image data is not performed are periodically disposed in the period from when the transmission of the thumbnail image data is started to when the transmission of the thumbnail image data is completed. Thus, in the period from when the transmission of the thumbnail image data is started to when the transmission of the thumbnail image data is completed, the period in which the device connected to the communication network N can perform the communication via the communication network N without being affected by the transmission of the thumbnail image data by the projector 2 appears periodically, and it is possible to keep the state in which the smooth communication via the communication network N can be achieved.

As shown in the flowchart FA in FIG. 4, the fourth control section 10d of the fourth tablet terminal 3d controls the fourth communication section 14d to sequentially receive (step SA5) the thumbnail image data transmitted by the thumbnail image transmission process.

Then, the fourth control section 10d makes the fourth touch panel 13d display (step SA6) a second user interface UI2 based on each of the thumbnail image data received.

Figure 8:
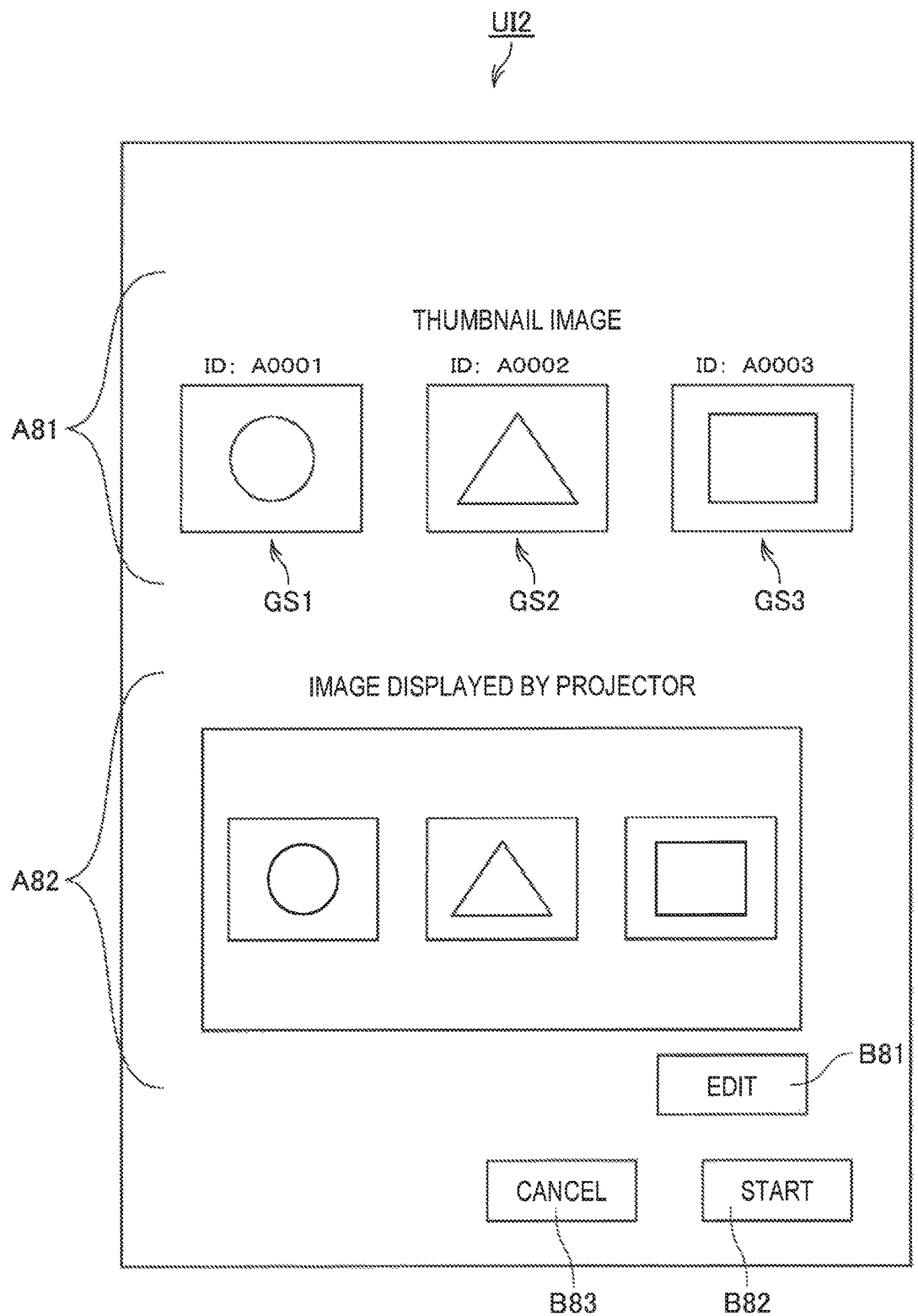
FIG. 8 is a diagram showing a second user interface.

FIG. 8 is a diagram showing the second user interface UI2.

As shown in FIG. 8, the second user interface UI2 has an area A81 and an area A82.

The area A81 is an area in which the thumbnail images based on the respective thumbnail image data received are displayed so as to be associated with the corresponding tablet terminal identification information. In the area A81 shown in FIG. 8, the thumbnail image GS1 is the thumbnail image related to the first tablet terminal 3a, the thumbnail image GS2 is the thumbnail image related to the second tablet terminal 3b, and the thumbnail image GS3 is the thumbnail image related to the third tablet terminal 3c.

The area A82 is an area in which the composite image (the image including the plurality of thumbnail images) to be made to be displayed by the projector 2 is displayed. The area A82 has an edit button B81. When the edit button B81 is operated, a predetermined edit image is displayed, and the user (the main user) can edit the content of the composite image using the predetermined edit screen. For example, it is possible for the user to change the position of the thumbnail image in the composite image, and change the size of the thumbnail image using the predetermined edit screen.

As shown in FIG. 8, the second user interface UI2 has a start button B82 for instructing the start of the display of the composite image, and a cancel button B83 for canceling the display of the composite image. In the case of starting the display of the composite image, the user operates (step S3) the start button B82.

When the fact that the start button B82 of the second user interface UI2 has been operated is detected, the fourth control section 10d generates (step SA7) the image data (hereinafter referred to as "composite image data") of the composite image displayed in the area A82.

Then, the fourth control section 10d controls the fourth communication section 14d to transmit (step SA8) the composite image data generated in the step SA7 to the projector 2.

As shown in the flowchart FB in FIG. 4, the projector control section 24 of the projector 2 controls the wireless communication section 33 to receive (step SB8) the composite image data.

Then, the projector control section 24 controls each section based on the composite data thus received to display (step SB9) the composite image based on the composite image data on the screen SC.

As a result, there occurs the state in which the composite image synchronized with the composite image displayed in the area A82 of the second user interface UI2 is displayed on the screen SC.

As described hereinabove, the display system 1 according to the present embodiment has the first tablet terminal 3a (the first terminal), the second tablet terminal 3b (the second terminal), and the projector 2 (the display device) capable of communicating with the first tablet terminal 3a and the second tablet terminal 3b via the communication network N (a network). The first tablet terminal 3a has the first touch panel 13a (the first display section) for displaying the first image, and the first communication section 14a (the first communication section) for transmitting the thumbnail image data (the first data) corresponding to the first image to the projector 2. The second tablet terminal 3b has the second touch panel 13b (the second display section) for displaying the second image, and the second communication section 14b (the second communication section) for transmitting the thumbnail image data (the second data) corresponding to the second image to the projector 2. The projector 2 has the wireless communication section 33 (the third communication section) for receiving the thumbnail image data from the first tablet terminal 3a, and receiving the thumbnail image data from the second tablet terminal 3b. The projector 2 requests the transmission of the thumbnail image data to the first tablet terminal 3a, and at the same time requests the transmission of the thumbnail image data to the second tablet terminal 3b. The first tablet terminal 3a and the second tablet terminal 3b transmit the thumbnail image data to the projector 2 in accordance with the request from the projector 2 at the respective timings different from each other via the communication network N.

According to this configuration, when the first tablet terminal 3a and the second tablet terminal 3b transmit the thumbnail image data to the projector 2 in accordance with the request from the projector 2, it is possible to prevent the plurality of tablet terminals 3 from transmitting the thumbnail image data to the projector 2 at the same time, and thus, it is possible to reduce the communication load of the communication network N.

Further, in the present embodiment, the projector 2 has the projection section 20 (the third display section) for displaying the composite image including the thumbnail image (an image corresponding to the first image) related to the first tablet terminal 3a, and the thumbnail image (an image corresponding to the second image) related to the second tablet terminal 3b.

According to this configuration, it is possible for the projector 2 to display the composite image including the images corresponding to the images displayed on the plurality of terminals.

Further, the display system 1 according to the present embodiment is further provided with a fourth tablet terminal 3d (the third terminal). The fourth tablet terminal 3d requests the transmission of the thumbnail image data related to the first tablet terminal 3a and the thumbnail image data related to the second tablet terminal 3b to the projector 2. The projector 2 transmits the thumbnail image data received from the first tablet terminal 3a and the thumbnail image data received from the second tablet terminal 3b to the fourth tablet terminal 3d. The fourth tablet terminal 3d generates the composite image data (the image data) of the composite image based on the thumbnail image data related to the first tablet terminal 3a and the thumbnail image data related to the second tablet terminal 3b thus received, and then transmits the composite image data to the projector 2. The projector 2 displays the composite image with the projection section 20 based on the composite image data received from the fourth tablet terminal 3d.

According to this configuration, regarding the display system in which the projector 2 collects the thumbnail image data from the first tablet terminal 3a and the second tablet terminal 3b to transmit the thumbnail image data to the fourth tablet terminal 3d in accordance with the request of the fourth tablet terminal 3d, and at the same time the fourth tablet terminal 3d transmits the composite image data to the projector 2 to make the projector 2 display the composite image, the communication load of the communication network N can be reduced.

Further, in the present embodiment, when the projector 2 transmits the thumbnail image data related to the first tablet terminal 3a and the thumbnail image data related to the second tablet terminal 3b to the fourth tablet terminal 3d, the projector 2 performs the process related to the transmission of the data at intervals.

According to this configuration, in the period from when the transmission of the thumbnail image data from the projector 2 to the fourth tablet terminal 3d is started to when the transmission is completed, periods in which the transmission of the thumbnail image data is not performed are disposed periodically. Thus, in the period from when the transmission of the thumbnail image data is started to when the transmission of the thumbnail image data is completed, the period in which the device connected to the communication network N can perform the communication via the communication network N without being affected by the transmission of the thumbnail image data by the projector 2 appears periodically, and it is possible to keep the state in which the smooth communication via the communication network N can be achieved.

Further, in the present embodiment, the projector 2 additionally notifies the first tablet terminal 3a and the second tablet terminal 3b of the terminal list information (the information related to the order of the terminals) when requesting the transmission of the thumbnail image data. The first tablet terminal 3a and the second tablet terminal 3b make the timings of transmitting the data different from each other so that the timings of transmitting the data are shifted from each other in accordance with the order of the terminals based on the terminal list information.

According to this configuration, it is possible for the first tablet terminal 3a and the second tablet terminal 3b to efficiently and reliably make the timings of transmitting the thumbnail image data different from each other using the terminal list information.

Further, in the present embodiment, the data to be transmitted by the first tablet terminal 3a in accordance with the request of the projector 2 is the thumbnail image data related to the image to be displayed by the first tablet terminal 3a. Further, the data to be transmitted by the second tablet terminal 3b in accordance with the request of the projector 2 is the thumbnail image data related to the image to be displayed by the second tablet terminal 3b.

According to this configuration, regarding the display system 1 in which the first tablet terminal 3a transmits the thumbnail image data and the second tablet terminal 3b transmits the thumbnail image data in accordance with the request from the projector 2, and the projector 2 displays the composite image including the thumbnail image related to the first tablet terminal 3a and the thumbnail image related to the second tablet terminal 3b, the communication load of the communication network N can be reduced.

It should be noted that the embodiment described above does not limit the scope of the invention, and the invention can also be implemented as a different aspect from the embodiment described above.

For example, in the embodiment described above, the fourth tablet terminal 3d as a different device from the projector 2 generates the composite image data, and the projector 2 receives the composite image data generated by the fourth tablet terminal 3d, and then displays the composite image based on the composite image data thus received. In contrast, the subject of generating the composite image data can also be the projector 2 itself. Specifically, it is also possible to adopt a configuration in which the projector control section 24 of the projector 2 generates the composite image data based on the thumbnail image data received in the case of receiving the thumbnail image data from the plurality of terminals, and then display the composite image with the projection section 20 based on the composite image data thus generated. In this case, the projector control section 24 functions as a "combining section." Even in this configuration, substantially the same advantages as in the embodiment described above can be obtained.

For example, in the composite image displayed by the projector 2 according to the present embodiment, there are included the thumbnail images related to the images displayed by the tablet terminals 3. However, the images included in the composite image are not limited to the thumbnail images, but it is also possible to adopt a configuration in which an image not shrunk is included.

Further, for example, in the present embodiment, the terminal list information is included in the thumbnail image request command transmitted by the projector 2 to the tablet terminals 3, and one tablet terminal 3 shifts the timing at which the tablet terminal 3 itself transmits the thumbnail image data from the timings at which other tablet terminals 3 transmit the thumbnail image data based on the terminal list information. However, the method of shifting the timing of transmitting the thumbnail image data between one tablet terminal 3 and other tablet terminals 3 is not limited to the method according to the present embodiment. For example, it is also possible to adopt a configuration in which every time the tablet terminals 3 receive the request of transmission of the thumbnail image data from the projector 2, the tablet terminals 3 randomly decide the value of the transmission timing elapsed time, and then transmit the thumbnail image data after the transmission timing elapsed time has elapsed.

Further, for example, in the embodiment described above, the number of the tablet terminals 3 to be connected to the communication network N is not particularly limited.

Further, for example, although in the embodiment described above, there is presented the description citing as an example the configuration in which the projector 2 installed in front of the screen SC projects the image forward, the invention is not limited to this configuration, and it is obviously possible to apply the invention to the configuration in which the screen SC is configured as a transmissive screen, and the projector 2 projects the image from the rear side of the screen SC. Further, the display device according to the invention is not limited to the projector for projecting images on the screen SC, but various display devices including a liquid crystal monitor or a liquid crystal television set for displaying images on a liquid crystal panel, a monitor device or a television receiver for displaying images on a plasma display panel (PDP), a light emitting display device such as a monitor device or the television receiver for displaying images on an organic EL display panel called an organic light-emitting diode (OLED), an organic electroluminescence (OEL), and so on can also be included in the image display device according to the invention, and further, a portable display device capable of color display of the image based on the image signal input thereto is also included therein. In this case, the liquid crystal panel, the plasma display panel, and the organic EL display panel correspond to the modulation section.

Further, each of the functional sections of the display system 1 described with reference to the drawings is for showing the functional configuration, and the specific mounting configurations are not particularly limited. In other words, it is not necessarily required to install the hardware corresponding individually to each of the functional sections, but it is obviously possible to adopt the configuration of realizing the functions of the plurality of functional sections by a single processor executing a program. Further, a part of the function realized by software in the embodiment described above can also be realized by hardware, or a part of the function realized by hardware can also be realized by software. Besides the above, the specific detailed configuration of the display system 1 can arbitrarily be modified within the scope or the spirit of the invention.

What is claimed is:

1. A display system comprising:
   a first terminal;
   a second terminal;
   a third terminal; and
   a display device configured to communicate with the first terminal and the second terminal via a network,
   wherein the first terminal includes a first display configured to display a first image, and a first communicator configured to transmit first data corresponding to the first image to the display device,
   the second terminal includes a second display configured to display a second image, and a second communicator configured to transmit second data corresponding to the second image to the display device,
   the display device includes a third communicator configured to receive the first data from the first terminal, and receive the second data from the second terminal,
   the third terminal requests transmission of the first data and the second data to the display device,
   the display device requests the first terminal to transmit the first data, requests the second terminal to transmit the second data, and sends a terminal list to the first terminal and the second terminal, the terminal list indicating a transmission ranking of the first terminal and the second terminal,
   based on the transmission ranking in the terminal list, the first terminal transmits the first data to the display device via the network in accordance with the request from the display device at a timing different from a timing at which the second terminal transmits the second data to the display device via the network, so as to reduce a communication load of the network,
   the display device transmits the first data received from the first terminal, and the second data received from the second terminal, to the third terminal,
   the third terminal generates image data of a composite image including an image corresponding to the first image and an image corresponding to the second image, based on the first data and the second data, includes a fourth display configured to display the composite image, and includes a third communicator configured to transmit the image data of the composite image to the display device, and
   the display device includes a third display configured to display the composite image based on the image data of the composite image received from the third terminal.

2. The display system according to claim 1, wherein the display device performs a process related to data transmission at intervals when transmitting the first data and the second data to the third terminal.

3. The display system according to claim 1, wherein the first data is image data of a thumbnail image of the first image, and the second data is image data of a thumbnail image of the second image.

4. A display device capable of communicating with a first terminal, a second terminal, and a third terminal via a network, comprising:
   a controller configured to:
   receive a request of transmission of first data and second data from the third terminal;
   request the first terminal to transmit the first data corresponding to a first image to be displayed by the first terminal;
   request the second terminal to transmit the second data corresponding to a second image to be displayed by the second terminal;

send a terminal list to the first terminal and the second terminal, the terminal list indicating a transmission ranking of the first terminal and the second terminal, so that the first terminal transmits the first data at a timing different from a timing at which the second terminal transmits the second data based on the transmission ranking in the terminal list, so as to reduce a communication load of the network;

transmit the first data received from the first terminal, and the second data received from the second terminal, to the third terminal which is configured to generate image data of a composite image including an image corresponding to the first image and an image corresponding to the second image, based on the first data and the second data, and display the composite image; and receive the image data of the composite image from the third terminal;

a communicator configured to receive the first data from the first terminal and the second data from the second terminal at the timings different from each other; and a display configured to display the composite image based on the image data of the composite image received from the third terminal.

5. The display system according to claim 4, wherein the controller is configured to:

perform a process related to data transmission at intervals when transmitting the first data and the second data to the third terminal.

6. The display system according to claim 4, wherein the first data is image data of a thumbnail image of the first image, and the second data is image data of a thumbnail image of the second image.

7. A method of controlling a display system having a first terminal, a second terminal, a third terminal, and a display device capable of communicating with the first terminal, the second terminal, and the third terminal via a network, the method comprising:

requesting, by the third terminal, transmission of first data and second data to the display device;

requesting, by the display device, the first terminal to transmit the first data corresponding to a first image to be displayed by the first terminal;

requesting, by the display device, the second terminal to transmit the second data corresponding to a second image to be displayed by the second terminal;

sending, by the display device, a terminal list to the first terminal and the second terminal, the terminal list indicating a transmission ranking of the first terminal and the second terminal;

transmitting, by the first terminal, the first data in accordance with the request from the display device, at a timing based on the transmission ranking in the terminal list;

transmitting, by the second terminal, the second data in accordance with the request from the display device at a timing different from the timing at which the first terminal transmits the first data based on the transmission ranking in the terminal list, so as to reduce a communication load of the network;

receiving, by the display device, the first data from the first terminal and the second data from the second terminal at the timings different from each other;

transmitting, by the display device, the first data received from the first terminal, and the second data received from the second terminal, to the third terminal;

generating, by the third terminal, image data of a composite image including an image corresponding to the first image and an image corresponding to the second image, based on the first data and the second data;

displaying, by the third terminal, the composite image;

transmitting, by the third terminal, the image data of the composite image to the display device; and displaying, by the display device, the composite image based on the image data of the composite image received from the third terminal.

8. The method according to claim 7, further comprising:

performing, by the display device, a process related to data transmission at intervals when transmitting the first data and the second data to the third terminal.

9. The method according to claim 7, wherein the first data is image data of a thumbnail image of the first image, and the second data is image data of a thumbnail image of the second image.

* * * * *